United States Patent [19]

Kitazawa et al.

[11] Patent Number: 5,318,622
[45] Date of Patent: Jun. 7, 1994

[54] NON-BAKED COLOR PENCIL LEADS AND METHOD FOR PREPARING SAME

[75] Inventors: Katsunori Kitazawa, Kanagawa; Yoji Nishimoto, Gunma; Toshiyuki Maeda; Michio Saito, both of Osaka, all of Japan

[73] Assignees: Mitsubishi Pencil Kabushiki Kaisha, Tokyo; Osaka Gas Co., Ltd., Osaka, both of Japan

[21] Appl. No.: 58,528

[22] Filed: May 6, 1993

[30] Foreign Application Priority Data

Jun. 3, 1992 [JP] Japan .................................. 4-166682

[51] Int. Cl.$^5$ ............................................. C09D 13/00
[52] U.S. Cl. ............................ 106/19 B; 106/19 A; 106/19 C; 106/19 E
[58] Field of Search ................. 106/19 A, 19 B, 19 C, 106/19 E

[56] References Cited

U.S. PATENT DOCUMENTS

| | | | |
|---|---|---|---|
| 1,502,763 | 7/1924 | Bugbee | 106/19 B |
| 2,273,935 | 2/1942 | Chester | 106/19 B |
| 2,355,639 | 8/1944 | Ferst et al. | 106/19 B |
| 4,931,163 | 6/1990 | Watanabe et al. | 106/284 |

FOREIGN PATENT DOCUMENTS

| | | | |
|---|---|---|---|
| 113274 | 7/1983 | Japan | 106/19 B |
| 000569 | 1/1987 | Japan | 106/19 B |

*Primary Examiner*—Helene Klemanski
*Attorney, Agent, or Firm*—Darby & Darby

[57] ABSTRACT

Novel non-baked color pencil leads are here disclosed which can be obtained by forming a blend composition from a filler, a pigment, a binder and the like without using any wax, at least one of the pigment and the filler being all or partially covered with a fluorinated aromatic compound, kneading the blend composition with a solvent and/or a plasticizer, extruding the kneaded material, drying the extruded articles to remove the solvent and/or the plasticizer therefrom, and then impregnating the porous articles with an oil, a fat and/or a wax.

The thus obtained non-baked color pencil leads are remarkably excellent in mechanical properties such as bending strength and pointed end strength, has a smooth writing performance, and permits the drawing of uniform lines. A high-temperature and short-time drying treatment is possible, which can remarkably decrease a manufacturing cost. The color pencil leads which can be erased with an eraser or the color pencil leads which cannot be erased with an eraser can be selectively prepared.

8 Claims, No Drawings

NON-BAKED COLOR PENCIL LEADS AND METHOD FOR PREPARING SAME

BACKGROUND OF THE INVENTION (i) Field of the Invention

The present invention relates mainly to wood-cased color pencil leads and color pencil leads for mechanical pencils. More specifically, it relates to non-baked color pencil leads which are remarkably excellent in mechanical properties such as bending strength and pointed end strength and which have a smooth writing performance. Furthermore, it relates to color pencil leads and a method for preparing the same by which the conventional color pencil leads not erasable with an eraser or the color pencil leads erasable with the eraser can be optionally prepared and which permits noticeably shortening a drying time and decreasing a manufacturing cost.

(ii) Description of the Prior Art

Conventional non-baked color pencil leads can be prepared by a wet process which comprises, if necessary, dissolving and swelling an organic polymeric material as a binder in a solvent such as water and/or a plasticizer, kneading the same with a wax, a filler, a pigment and the like, extruding the kneaded material, and then drying the extruded articles to remove the solvent and/or the plasticizer therefrom.

In this wet process, however, it is necessary that a drying temperature is set to the melting point or less of the wax so as to prevent the bleeding of the wax, and therefore a tremendous period of time is taken in the drying step. Moreover, leads prepared by a dry process, in which the solvent and/or the plasticizer is not used and the drying step is omitted, are also put on the market, but the quality of these leads is inferior to that of the leads obtained by the wet process.

In connection with the strength and the writing performance of the conventional color pencil leads obtained by the wet process, the adhesion of the filler and pigment by the binder is partially impeded with the wax, so that the pencil leads are worn at the drawing and exert lubricating properties and a staining power.

However, when the wax is kneaded with a blend composition containing the filler, the pigment, the binder and the like, followed by molding, the effects of the smooth writing performance and the excellent staining power are remarkable, but the deterioration of strength is also large. In consequence, any satisfactory color pencil leads balanced between the strength and the writing performance have not been obtained so far.

Heretofore, it has been difficult to erase, by an eraser, lines drawn on a paper with a usual color pencil.

On the other hand, the non-baked color pencil leads which are said to be erasable with an eraser are also put on the market, and most of these leads contain the binder, which is a non-polar organic material, and the wax as the main components in order to be easily removed from the fibers of a paper. In addition, the staining power is increased by softening the leads so as to permit drawing under weak pencil pressure, whereby the lead composition is prevented from getting into between the fibers of the paper at the drawing to obtain erasability.

However, the pigment tenaciously sticks between the fibers of the paper at the depiction by the wax, and the lead composition which has once stuck between the fibers of the paper cannot be removed completely by the adsorbing power of the eraser. Thus, this erasability is not practically satisfactory.

The removal of the drawn lines by the adsorbing power of the eraser can be achieved by using the oil, the fat and/or the wax which is liquid at ordinary temperature for all of the wax.

However, in the conventional wet process, the drying step is effected by heating at 50°–60° C., and therefore the oil, the fat and/or the wax bleeds and the shape of the leads cannot be maintained any more in the drying step. In consequence, the conventional wet process cannot practically utilize such an oil, fat and/or wax.

Thus, it can be conceived that color pencil porous leads are first prepared, and they are then impregnated with the oil, the fat and/or the wax which is liquid at ordinary temperature.

In order to form the open pores in the pencil porous leads, some techniques have been heretofore suggested which are a technique of adding a sublimable material, a technique of adding a pyrolysis material and a technique such as an acid and an alkali solution treatment. However, in every technique, an organic pigment is heated to a level higher than the thermal deterioration temperature of this organic pigment, and so the color pencil porous leads having a sharp color cannot be obtained.

The baked color pencil leads are only put on the market which can be prepared by kneading a clay, a white filler, a binder and the like, molding the kneaded material, baking the molded articles in an oxygen atmosphere to form baked white pencil porous leads, and then impregnating them with an ink. With regard to these baked color pencil leads, their erasability with the eraser is substantially satisfactory, but since it is impossible to impregnate the porous leads with a highly concentrated pigment ink, the impregnation is carried out by the use of a dye ink. The leads obtained by using the dye ink have the problem that they are very poor in light resistance and staining power as compared with the non-baked pencil color leads in which the pigment is used.

In order to overcome these drawbacks, a novel preparation process of color pencil leads has been contrived by a part of the inventors of the present invention, and this novel process comprises blending a water/oil repellent substance with other materials, forming open pores owing to the less wettability of the water/oil repellent substance, and then impregnating the resultant porous articles with an oil, a fat and/or a wax.

Examples of the optimum white water/oil repellent substance having excellent lubricating properties which can be used in the preparation method of the novel color pencil leads include two of graphite fluoride and boron nitride. However, in order to uniformly disperse 2 to 20 parts by weight of the water/oil repellent substance, sufficient care must be taken, since this substance is originally less wettable. In addition, the water/oil repellent substance is used in a relatively small amount, and therefore it can be presumed that some segregation is present.

When the water/oil repellent substance segregates, the open pores formed owing to the less wettability of the water/oil repellent substance also segregate, and this fact further gives rise to the segregation of the oil, the fat and/or the wax with which the porous articles are impregnated. At the time of drawing, consequently, the color pencil leads have a tendency to wear down in a nonuniform state, so that the coloring of drawn lines is uneven. In view of the fact that the more uniform lines are desired, the segregation of the water/oil repellent substance is not preferable.

SUMMARY OF THE INVENTION

An object of the present invention is to eliminate the drawbacks of the above-mentioned conventional method for preparing non-baked color pencil leads. The first object of the present invention is to provide non-baked color pencil leads which are remarkably excellent in mechanical properties such as bending strength and pointed end strength and which has a smooth writing performance. The second object of the present invention is to provide a method for preparing the color pencil leads by which the conventional non-baked color pencil leads not erazable with an eraser or the non-baked color pencil leads easily erasable with the eraser can be selectively prepared. The third object of the present invention is to provide a method for noticeably shortening a drying time to decrease a manufacturing cost. The fourth object of the present invention is to provide color pencil leads capable of drawing more uniform lines.

The aspects of the present invention are directed to the following constitutions:

(1) Non-baked color pencil leads comprising a pigment, a filler and a binder, at least one of the pigment and the filler being all or partially covered with a fluorinated aromatic compound, said pencil leads having open pores impregnated with an oil, a fat and/or a wax.

(2) The non-baked color pencil leads according to the preceding paragraph (1) wherein the amount of the pigment and/or the filler covered with the fluorinated aromatic compound is in the range of 15 to 70% by weight based on the amount of the total blend composition.

(3) The non-baked color pencil leads according to the preceding paragraph (1) wherein the fluorinated aromatic compound comprises at least one of fluorinated aromatic compounds comprising pitch fluoride and fluorinated compounds constituted with 7 or less rings.

(4) The non-baked color pencil leads according to the preceding paragraph (1) wherein the fluorinated aromatic compound is a pitch fluoride.

(5) A method for preparing non-baked color pencil leads which comprises steps of kneading a solvent and/or a plasticizer with a blend composition comprising a pigment, a filler and a binder, at least one of the pigment and the filler being all or partially covered with a fluorinated aromatic compound; extruding the kneaded material; drying the extruded articles to remove the solvent and/or the plasticizer and to thereby form open pores therein owing to the less wettability of the fluorinated aromatic compound-covered pigment and/or the fluorinated aromatic compound-covered filler; and then impregnating the open pores of the resultant porous articles with an oil, a fat and/or a wax.

(6) The method for preparing non-baked color pencil leads according to the preceding paragraph (5) wherein the amount of the fluorinated aromatic compound-covered pigment and/or the fluorinated aromatic compound-covered filler is in the range of 15 to 70% by weight based on the amount of the total blend composition.

(7) The method for preparing non-baked color pencil leads according to the preceding paragraph (5) wherein the fluorinated aromatic compound comprises at least one of fluorinated aromatic compounds comprising a pitch fluoride and a fluorinated compound constituted with 7 or less rings.

(8) The method for preparing non-baked color pencil leads according to the preceding paragraph (5) wherein the fluorinated aromatic compound is a pitch fluoride.

DETAILED DESCRIPTION OF THE INVENTION

The present inventors have intensively researched to solve the above-mentioned problems, and as a result, they have found that these problems can be solved by using a pigment covered with a fluorinated aromatic compound and/or a filler covered with a fluorinated aromatic compound having water/oil repellent properties in place of a water/oil repellent substance, kneading the fluorinated aromatic compound-covered pigment and/or the fluorinated aromatic compound-covered filler having water/oil repellent properties with a binder, without adding an oil, a fat and/or a wax in an initial step, extruding and drying the kneaded material to form open pores therein, and then impregnating the open pores with the oil, the fat and/or the wax. Thus, the present invention has now been completed.

The fluorinated aromatic compound is a compound obtained by fluorinating an aromatic compound.

The fluorination of the aromatic compound can be achieved by directly reacting an aromatic compound such as pitch or anthracene with fluorine in a gaseous phase or an inert fluid, or by carrying out a reaction in accordance with another known fluorination process.

That is, the present inventors have paid much attention to the fact that the fluorinated aromatic compound comprising a pitch fluoride and a fluorinated compound constituted with 7 or less rings is soluble in a solvent and is applicable to vacuum deposition, and these excellent characteristics are not present in a conventional water/oil repellent substance such as graphite fluoride. Thus, it has been contrived by them to cover all or partially the surfaces of the pigment and/or the filler with the fluorinated aromatic compound.

That is, instead of blending at least a small amount of the water/oil repellent substance, the surfaces of the pigment and the filler to be blended in large quantities are partially or all covered with the fluorinated aromatic compound to impart the water/oil repellent properties to them. In consequence, the pigment and the filler can easily be dispersed, and open pores formed owing to the less wettability of the pigment and the filler are restrained from segregating, so that the color pencil leads can be obtained in which these open pores are more uniformly present.

The fluorinated aromatic compound for the production of the fluorinated aromatic compound-covered pigment and the fluorinated aromatic compound-covered filler which can be used in the present invention comprises at least one of fluorinated aromatic compounds comprising a pitch fluoride and a fluorinated compound constituted with 7 or less rings.

Typical examples of the pitch fluoride include known substances disclosed together with their methods in Japanese Patent Application Laid-open No. 62-275190, U.S. Pat. No. 4,931,163 and EP Patent No. 0222149B1. In short, they are substances obtained by fluorinating pitches.

With respect to a pitch, it is known that a pitch has a layer structure in which layers containing planar aromatic condensed rings are stacked to form a packing structure. The planar aromatic condensed rings are believed to be crosslinked by an aliphatic hydrocarbon residue, such as methylene [Carbon, Vol. 15, 17(1977)]. In this literature, the layer structure of a planar aromatic condensed ring is confirmed by the following method. The quinoline insoluble contents [QI] of a pitch are observed by means of a high resolution electron microscope to confirm the layer structure of the planar aromatic condensed ring. Further, through the observations using a high resolution electron microscope etc., it is found that the sizes of the planar molecules are about 6 to 15 Å, which correspond to condensed ring compounds having a molecular weight of 150 to 800 or more. On the other hand, the molecular weight is also determined by the solvent extraction method and found to be 400 to 3,000 or more. From these facts, the author of the literature concludes that relatively small condensed ring compounds are crosslinked by methylene to form higher molecular weight compounds. Further confirmation of the presence of a methylene group by H-NMR analysis and $C^{13}$-NMR analysis is still in progress. The term "pitch" as used in the present invention is intended to mean those having the above-mentioned structure. Examples of pitches include products obtained by subjecting petroleum heavy oil or coal heavy oil, such as a still residue of petroleum distillation, thermal decomposition residue of naphtha, ethylene bottoms, liquefied coal and coal tar, to distillation to remove low boiling components having boiling points lower than 200° C., and products obtained by subjecting the above-obtained low boiling components-free products to further treatment, such as heat treatment and/or hydrogenation. Examples of pitches also include products obtained by subjecting petroleum heavy oil or coal heavy oil to treatment such as heat treatment and/or hydrogenation and subjecting the treated oil to distillation to remove low boiling components having boiling points lower than 200° C. As representative examples of pitches, there may be mentioned an isotropic pitch, a mesophase pitch, a hydrogenated mesophase pitch, etc. Further, in the present invention, meso-carbon microbeads can also be employed as a raw material for producing a pitch fluoride of the present invention. Meso-carbon microbeads can be obtained by distilling a petroleum heavy oil or coal heavy oil to remove low boiling components, subjecting the resulting residue to heat treatment to form mesophase spheres and collecting the mesophase spheres. Both the pitches and meso-carbon microbeads are hereinafter often referred to simply as "pitch".

Typical examples of the fluorinated aromatic compounds comprising 7 or less rings include perfluoroperhydroanthracene, perfluoroperhydroperillene, perfluoroperhydropyrene and perfluoroperhydrocoronene.

The fluorinated aromatic compound-covered pigment and the fluorinated aromatic compound-covered filler which can be used in the present invention can be obtained by the use of the fluorinated aromatic compound in accordance with a solution dipping method. The fluorinated aromatic compound-covered pigment and the fluorinated aromatic compound-covered filler which can be used in the present invention may be that produced by another method such as vacuum deposition method.

In order to obtain the fluorinated aromatic compound-covered pigment by the solution dipping method, the fluorinated aromatic compound is dissolved in a fluorine-based solvent (hexafluorobenzene or a FLON (Chlorofluoro hydrocarbon)-based solvent) to extract a solvent-soluble fluorinated aromatic compound. Afterward, this solvent is regulated so that the concentration of the fluorinated aromatic compound may be in the range of 5-15%, and a pigment is then added to the solution. Next, the solution containing the pigment is sufficiently stirred by a batch type table sand mill to uniformly disperse the pigment therein. Afterward, the formed suspension is dried under reduced pressure, and the resultant dried cake is then ground by a jet mill and a roller mill. Alternatively, the suspension may be spray-dried.

. In order to obtain the fluorinated aromatic compound-covered filler by the solution dipping method, a filler is used in place of the aforesaid pigment.

Examples of the pigment which can be used in the present invention include inorganic pigments such as titanium oxide, zinc flower,. carbon black, graphite, black iron oxide, red iron oxide, prussian blue, ultramarine, aluminum powder, bronze powder and mica titanium, and all of known organic pigments such as Permanent Red 4R, Lithol Red (Ba), Lake Red C, Pyrazolone Orange, First Yellow 10G, Disazo Yellow AAA, Phthalocyanine Green, Phthalocyanine Blue R, Victoria Blue Lake, Methyl Violet Lake, Bordeaux 10B, Brilliant Carmine 6B and synthetic resin solid solution type daylight fluorescent pigments.

Examples of the filler which can be used in the present invention include all of known fillers such as calcium carbonate, clay, kaolin, talc, precipitated barium sulfate and mica.

Examples of the binder which can be used in the present invention include synthetic and natural materials, i.e., cellulose derivatives such as carboxymethyl cellulose, methyl cellulose, ethyl cellulose, hydroxyethyl cellulose, hydroxypropyl cellulose, cellulose acetate and cellulose nitrate; polyvinyl alcohol, polyvinyl butyral, polymethyl methacrylate, tragacanth gum, gum arabi, cyamoposis gum, gum dammer and locust bean gum, and they can be used singly or in combination. In view of a drying time, the water-soluble resin and the thermoplastic resin which can dissolve or swell in a low-boiling solvent are preferable, and among these resins, in view of a writing performance and strength, the resins having high bending strength and high stiffness are further preferable.

As the oil, the fat and/or the wax with which the leads are impregnated, any one can be used, so long as it can be easily introduced into the open pores, even if it is not heated up to a temperature at which the pigment thermally deteriorates. Examples of the oil, the fat and/or the wax include known materials, i.e., silicone oil, mineral oils, liquid paraffin, α-olefin oligomer, lard, petroleum waxes such as paraffin wax and microcrystalline wax, carnauba wax, candelilla wax, montan wax, bee's wax, Japan wax, synthetic Japan wax, caster wax and stearic acid. Needless to say, they can be used singly or in combination.

In order to prepare the leads which can be erased with an eraser as easily as baked black leads for pencil, the oil, the fat and/or the wax which is liquid at ordinary temperature should be selected.

The feature of the present invention resides in that the oil, the fat and/or the wax is not kneaded with the filler, the pigment and the binder at an initial stage in contrast to the preparation of a conventional non-baked color pencil leads, and instead, the fluorinated aromatic compound-covered pigment, the fluorinated aromatic compound-covered filler, binder and, if necessary, the solvent and/or the plasticizer are kneaded, extruded, and then dried to form open pores owing to the less wettability of the surfaces of the fluorinated aromatic compound-covered pigment and/or the fluorinated aromatic compound-covered filler, followed by impregnating the open pores with the oil, the fat and/or the wax.

If all of the pigment and the filler which can be used in the present invention are covered with the fluorinated aromatic compound, the surfaces of the fluorinated aromatic compound-covered pigment and the fluorinated aromatic compound-covered filler become water/oil repellent. Therefore, it is difficult to make them wet with the binder, a solvent such as water and/or the plasticizer, and thus the molding into the shape of leads is impossible. For this reason, it is not preferable to cover all of the pigment and the filler with the fluorinated aromatic compound. However, if the concentration of the fluorinated aromatic compound is set to a low level, easily wettable parts of the pigment and the filler can remain. Accordingly, it is possible to treat all of the pigment and the filler with the fluorinated aromatic compound having the low concentration.

In the present invention, in the case that all of the pigment is covered with the fluorinated aromatic compound, it is preferable that the necessary filler is partially covered or not covered at all with the fluorinated aromatic compound and the total content of the fluorinated aromatic compound-covered pigment and the fluorinated aromatic compound-covered filler is in the range of 15 to 70% by weight based on the weight of the total blend composition.

In the case that all of the filler is covered with the fluorinated aromatic compound, it is preferable that the necessary pigment is partially covered or not covered at all with the fluorinated aromatic compound and the total content of the fluorinated aromatic compound-covered pigment and the fluorinated aromatic compound-covered filler is in the range of 15 to 70% by weight based on the weight of the total blend composition.

In the case that a part of the necessary filler and a part of the necessary filler are covered with the fluorinated aromatic compound, it is preferable that the total content of the fluorinated aromatic compound-covered pigment and the fluorinated aromatic compound-covered filler is in the range of 15 to 70% by weight based on the weight of the total blend composition.

The functional mechanisms of the present invention can be summarized as follows.

(1) The fluorinated aromatic compound-covered substance having the excellent water repellency and oil repellency has a large contact angle to the organic polymeric material as the binder, water as the solvent and the plasticizer, so that the water/oil repellent substance is difficult to wet. Therefore, in the molded articles which can be obtained by kneading the water/oil repellent substance with the blend composition containing the filler, the pigment, the binder and the like as well as the solvent and/or the plasticizer, extruding the mixture, and then drying the extruded articles to remove the solvent and/or the plasticizer therefrom, the filler and the pigment which are not covered with the fluorinated aromatic compound adhere each other by the binder, but the filler and the pigment which are covered with the fluorinated aromatic compound does not wet to the binder, with the result that spaces (open pores) are formed in these portions, whereby the non-baked color pencil porous articles can be obtained.

The open pores permits the non-baked color pencil porous leads to be worn at drawing, though these leads have high mechanical strength. Furthermore, the open pores continuously extend to the central portion of each lead owing to the dispersion of the filler and the pigment which are covered with the fluorinated aromatic compound and the porous leads can be impregnated with the oil, the fat and/or the wax. Owing to the impregnated oil, fat and/or wax, the leads can be more worn, thereby obtaining a smooth writing performance and an excellent staining power.

(2) In the case that fluorinated graphite or boron nitride is used as the water/oil repellent substance, its amount to be used is preferably from 2 to 20 parts by weight based on the weight of the total blend composition. However, since this substance is originally less wettable, sufficient care must be taken. In addition, the amount of the water/oil repellent substance to be used is relatively small, and therefore it can be presumed that some segregation is present.

When the water/oil repellent substance segregates, the formation of the open pores also segregates, and this fact further gives rise to the segregation of the oil, the fat and/or the wax with which the porous articles of the non-baked color pencil leads are impregnated. At the time of drawing, consequently, the color pencil leads have a tendency to wear down in a nonuniform state, so that the coloring of the drawn lines is uneven.

The fluorinated aromatic compound-covered pigment and the fluorinated aromatic compound-covered filler regarding the present invention can be used in a ratio of 15–70% by weight based on the weight of the total blend composition, and therefore segregation is restrained from occurring at the time of the dispersion, so that the formation of the open pores is scarcely segregated. In consequence, there can be inhibited the segregation of the oil, the fat and/or the wax with which the porous articles of the non-baked color pencil leads are impregnated, so that the color pencil leads can be worn down in a uniform state and the coloring of the drawn lines is also uniform.

(3) In the method of the present invention, the spaces (open pores) of the leads are packed with the oil, the fat and/or the wax by the dipping, and so there is the effect that the strength more increases than before the impregnation. Thus, the color pencil leads can be obtained which are remarkably excellent in mechanical properties such as bending strength and pointed end strength.

(4) The various color pencil leads having different staining power, smoothness, erasability, strength, hardness and the like can be obtained from one kind of non-baked color pencil porous leads by selectively using the oil, the fat and/or the wax to be impregnated.

That is, when the impregnation is made with the oil, the fat and/or the wax having a high adhesive power to a paper which is solid at ordinary temperature, the conventional non-baked color pencil leads which cannot be erased with an eraser can be obtained; and when the impregnation is made with the oil, the fat and/or the wax having a low adhesive power to the paper which is liquid at ordinary temperature, the non-baked color pencil leads which can easily be erased with the eraser can be obtained.

(5) Since the drying step is carried out for the articles in which the wax or the like is not contained yet, it is not necessary to take care of the bleed which takes place owing to the melting of the wax or the like, and a drying temperature can be elevated up to a limit under which the thermal deterioration of the pigment does not occur, whereby the drying step can be achieved in a short period of time. This remarkable time curtailment of the drying step results in the decrease of a manufacturing cost.

Therefore, in the preparation method of the non-baked color pencil leads of the present invention, the oil, the fat and/or the wax is not added at the initial stage, and the pigment partially or wholly covered with the fluorinated aromatic compound and the filler partially or wholly covered with the fluorinated aromatic compound are added, followed by drying at a high temperature for a short period of time, thereby forming the non-baked color pencil lead porous articles which have high strength and which can wear at the time of drawing. Afterward, these porous articles are impregnated with the oil, the fat and/or the wax. According to this preparation method, the drying time can be noticeably curtailed and thus a manufacturing cost can be decreased, as compared with a conventional preparation method of the non-baked color pencil leads.

The non-baked color pencil leads as commercial articles of the present invention have remarkably excellent mechanical strength and can provide a smooth writing performance and uniform drawn lines, and the conventional non-baked color pencil leads which cannot be erased with an eraser or the non-baked color pencil leads which can be easily erased with the eraser can be optionally obtained by suitably selecting the oil, the fat and/or the wax.

EXAMPLES

Now, the present invention will be described in more detail with regard to examples, and the scope of the present invention should not be limited to these examples.

EXAMPLE 1

A solution dipping method for preparing a lake red pigment and talc covered with a pitch fluoride will be described in detail.

The pitch fluoride which would be used to cover the lake red pigment and talc was prepared as follows: the pitch fluoride obtained by the above-mentioned procedure was dissolved in a fluorine-based solvent (a FLON R113 solvent), and a solvent-soluble pitch fluoride was extracted from the resultant solution by vacuum filtration, thereby obtaining a solution in which the pitch fluoride was dissolved. Afterward, the solvent was all removed from this solution by vacuum drying with a rotary evaporator to obtain a solvent-soluble pitch fluoride powder.

In order to cover the lake red pigment and talc with the pitch fluoride, the solvent-soluble pitch fluoride obtained by the above-mentioned procedure was dissolved in the fluorine-based solvent (FLON R113) in a following blend ratio. Next, each of the lake red pigment and talc was added to the resultant solution in the following blend ratio, and the solution was then sufficiently stirred by a batch type table sand mill to disperse the pigment and talc therein and to thereby cover the surfaces of the particles with the pitch solution. Afterward, the resultant suspension was subjected to a vacuum drying treatment using the rotary evaporator and further subjected to a vacuum drying treatment using a vacuum drying machine at an atmospheric temperature of 100° C. a whole day and night. In the last place, the resultant dried cake was ground by a batch type table sand mill to obtain a pitch fluoride-covered lake red pigment and a pitch fluoride-covered talc.

| (In the case of lake red pigment) | |
|---|---|
| Pitch fluoride (solvent-soluble component) | 75.5 pts. wt. |
| Fluorine-based solvent (FLON R113) | 786 pts. wt. |
| Lake red pigment | 500 pts. wt. |
| (In the case of talc) | |
| Pitch fluoride (solvent-soluble component) | 170 pts. wt. |
| Fluorine-based solvent (FLON R113) | 1,415 pts. wt. |
| Talc powder | 900 pts. wt. |

The following blend composition containing the pitch fluoride-covered lake red pigment and the pitch fluoride-covered talc obtained by the above-mentioned procedure was stirred by a Henschel mixer, and water was then added thereto in an amount equal to the total weight of the blend composition. After mixing and dispersing by a kneader, a water content was regulated, while the mixture was kneaded by two rolls. This mixture was pelleted and then extruded through a single screw extruder, and the thus extruded articles were then dried at 100° C. for 3 hours to remove water therefrom, thereby obtaining non-baked red color pencil lead porous articles of 3.0 mm in diameter. These porous articles were then impregnated with synthetic Japan wax at 120° C. to obtain non-baked red color pencil leads having a diameter of 3.0 mm. The physical properties of the thus obtained pencil leads are shown in Table 1.

| Carboxymethyl cellulose | 6 wt % |
|---|---|
| Pitch fluoride-covered talc | 25 wt % |
| Talc (not covered with pitch fluoride) | 44 wt % |
| Pitch fluoride-covered lake red pigment | 25 wt % |

EXAMPLE 2

| Carboxymethyl cellulose | 6 wt % |
|---|---|
| Talc (not covered with pitch fluoride) | 69 wt % |
| Pitch fluoride-covered lake red pigment | 25 wt % |

A pitch fluoride-covered lake red pigment obtained in Example 1 was used in the above-mentioned blend composition, and the same procedure as in Example 1 was repeated to obtain non-baked red color pencil leads having a diameter of 3.0 mm. The physical properties of the thus obtained pencil leads are shown in Table 1.

EXAMPLE 3

| Carboxymethyl cellulose | 6 wt % |
|---|---|
| Pitch fluoride-covered talc | 69 wt % |
| Lake red pigment (not covered with pitch fluoride) | 25 wt % |

A pitch fluoride-covered talc obtained in Example 1 was used in the above-mentioned blend composition, and the same procedure as in Example 1 was repeated to obtain non-baked red color pencil leads having a diameter of 3.0 mm. The physical properties of the thus obtained pencil leads are shown in Table 1.

COMPARATIVE EXAMPLE 1

| Carboxymethyl cellulose | 6 wt % |
|---|---|
| Talc | 69 wt % |
| (not covered with pitch fluoride) | |
| Lake red pigment | 25 wt % |
| (not covered with pitch fluoride) | |

The above-mentioned blend composition was stirred by a Henschel mixer, and the same procedure as in Example 1 was repeated to obtain non-baked red color pencil leads having a diameter of 3.0 mm. The physical properties of the thus obtained pencil leads are shown in Table 1.

COMPARATIVE EXAMPLE 2

| Carboxymethyl cellulose | 6 wt % |
|---|---|
| Talc | 64 wt % |
| (not covered with pitch fluoride) | |
| Lake red pigment | 25 wt % |
| (not covered with pitch fluoride) | |
| Pitch fluoride | 5 wt % |

The above-mentioned blend composition was stirred by a Henschel mixer, and the same procedure as in Example 1 was repeated to obtain non-baked red color pencil lead porous articles having a diameter of 3.0 mm. Afterward, these porous articles were impregnated with α-olefin oligomer at 100° C. to obtain non-baked red color pencil leads having a diameter of 3.0 mm. The physical properties of the thus obtained pencil leads are shown in Table 1.

COMPARATIVE EXAMPLE 3

| Carboxymethyl cellulose | 6 wt % |
|---|---|
| Talc | 64 wt % |
| (not covered with pitch fluoride) | |
| Lake red pigment | 25 wt % |
| (not covered with pitch fluoride) | |
| Graphite fluoride | 5 wt % |

The above-mentioned blend composition was stirred by a Henschel mixer, and the same procedure as in Example 1 was repeated to obtain non-baked red color pencil leads having a diameter of 3.0 mm. The physical properties of the thus obtained pencil leads are shown in Table 1.

EXAMPLE 4

Non-baked color pencil lead porous articles of Example 1 were impregnated with α-olefin oligomer at 100° C. to obtain non-baked red color pencil leads having a diameter of 3.0 mm. The physical properties of the thus obtained pencil leads are shown in Table 1.

EXAMPLE 5

Non-baked color pencil lead porous articles of Example 2 were impregnated with silicone oil at 100° C. to obtain non-baked red color pencil leads having a diameter of 3.0 mm. The physical properties of the thus obtained pencil leads are shown in Table 1.

EXAMPLE 6

Non-baked color pencil lead porous articles of Example 3 were impregnated with silicone oil at 100° C. to obtain non-baked red color pencil leads having a diameter of 3.0 mm. the physical properties of the thus obtained pencil leads are shown in Table 1.

EXAMPLE 7

| Cellulose acetate | 40 wt % |
|---|---|
| Pitch fluoride-covered talc | 40 wt % |
| Lake red pigment | 20 wt % |
| (not covered with pitch fluoride) | |

Methyl ethyl ketone was added to the above-mentioned blend composition in an amount equal to the weight of this blend composition. After mixing and dispersing by a kneader, a solvent content was regulated, while the mixture was kneaded by two rolls. This kneaded material was pelleted and then extruded through a single screw extruder, and the thus extruded articles were then dried at 120° C. for 1 hour to remove the solvent therefrom, thereby obtaining non-baked red color pencil lead porous articles of 0.570 mm in diameter. These porous articles were then impregnated with α-olefin oligomer at 100° C. to obtain non-baked red color pencil leads having a diameter of 0.570 mm. The physical properties of the thus obtained pencil leads are shown in Table 1.

COMPARATIVE EXAMPLE 4

| Polyvinyl alcohol | 5 wt % |
|---|---|
| Ball clay | 45 wt % |
| Boron nitride | 50 wt % |

Water was added to the above-mentioned blend composition in an amount equal to the weight of this blend composition. After mixing and dispersing by a kneader, a water content was regulated, while the mixture was kneaded by two rolls. This mixture was extruded through a plunger extruder, and the thus extruded articles were then dried at 150° C. for 1 hour to remove water therefrom. Next, the thus extruded articles were heated to 1,100° C. in an argon gas and then baked at 1,100° C. for 1 hour. Furthermore, the articles were further baked at 700° C. for 3 hours in an oxidizing atmosphere to obtain baked white color pencil lead porous articles having a diameter of 0.570 mm. These porous articles were then impregnated with a nonvolatile oily red dye ink to obtain baked red color pencil leads having a diameter of 0.570 mm. The physical properties of the thus obtained pencil leads are shown in Table 1.

COMPARATIVE EXAMPLE 5

| Cellulose acetate | 35 wt % |
|---|---|
| Talc | 30 wt % |
| (not covered with pitch fluoride) | |
| Lake red pigment | 15 wt % |
| (not covered with pitch fluoride) | |
| Calcium stearate | 20 wt % |

Methyl ethyl ketone was added to the above-mentioned blend composition in an amount equal to the weight of this blend composition, and they were mixed and dispersed by a kneader. Afterward, a solvent content was adjusted, while they was kneaded by the use of two rolls, and the kneaded material was pelleted and then extruded through a single screw extruder. Next, the extruded articles were dried at 50° C. for 20 hours to remove the solvent therefrom, thereby obtaining non-baked red color pencil leads having a diameter of 0.570 mm. The physical properties of the thus obtained pencil leads are shown in Table 1.

COMPARATIVE EXAMPLE 6

| | |
|---|---|
| Polyethylene | 20 wt % |
| Talc (not covered with pitch fluoride) | 20 wt % |
| Lake red pigment (not covered with pitch fluoride) | 15 wt % |
| Paraffin wax | 35 wt % |
| Candelilla wax | 10 wt % |

The above-mentioned blend composition was mixed and dispersed by a kneader, and afterward it was kneaded by the use of two rolls. The resultant mixture was pelleted and then extruded through a single screw extruder, thereby obtaining non-baked red color pencil porous leads having a diameter of 3.0 mm. The physical properties of the thus obtained pencil leads are shown in Table 1.

TABLE 1

| | Bending[1] Strength gf/mm$^2$ | Impregnation Ratio[2] % | Drying Time hr | Eras-[3] ability |
|---|---|---|---|---|
| Example 1 | 7,500 | 16.0 | 3 | |
| Example 2 | 7,800 | 15.5 | 3 | |
| Example 3 | 7,500 | 16.5 | 3 | |
| Example 4 | 6,500 | 15.3 | 3 | o |
| Example 5 | 6,700 | 15.8 | 3 | o |
| Example 6 | 6,500 | 16.7 | 3 | o |
| Example 7 | 14,500 | 15.0 | 1 | o |
| Comp. Ex. 1 | 6,500 | 1.8 | 3 | o |
| Comp. Ex. 2 | 5,800 | 3.9 | 3 | o |
| Comp. Ex. 3 | 7,800 | 16.0 | 3 | |
| Comp. Ex. 4 | 9,700 | 12.8 | 1 | o |
| Comp. Ex. 5 | 10,400 | — | 20 | |
| Comp. Ex. 6 | 2,300 | — | — | Δ |

[1]It was measured in accordance with JIS-S-6005-1989.
[2]The impregnation ratio = [(weight after the impregnation/weight before the impregnation)-1] × 100 (%)
[3]Erasability:
o: Drawn lines could be erased as easily as in case of baked black leads for pencils.
Δ: The erasability with an eraser was poorer than in case of baked black leads for pencils.
no sign: Refer to TABLE 1(Continued)

| | Uneras-[4] ability | Light[5] Resistance | Hardness | Writing[6] Performance |
|---|---|---|---|---|
| Example 1 | o | o | Medial | o |
| Example 2 | o | o | Medial | o |
| Example 3 | o | o | Medial | o |
| Example 4 | | o | Medial | o |
| Example 5 | | o | Medial | o |
| Example 6 | | o | Medial | o |
| Example 7 | | o | Hard | o |
| Comp. Ex. 1 | | o | Hard | Δ |
| Comp. Ex. 2 | | o | Hard | x |
| Comp. Ex. 3 | o | o | Medial | Uneven |
| Comp. Ex. 4 | x | | Hard | Δ |
| Comp. Ex. 5 | o | o | Hard | Δ |
| Comp. Ex. 6 | | o | Soft | Δ |

[4]Unerasability:
o: Drawn lines could not be erased with an eraser.
no sign: Refer to TABLE 1
[5]Light resistance: It was measured in accordance with JIS-S-6005-1989 and JIS-L-0841-1983, and results were evaluated in accordance with JIS-S-6005-1989 and JIS-L-0801-1978-10.
o: Good
x: Bad
[6]Writing performance:
o: Smooth
Δ: Not so smooth
x: Coarse

What is claimed is:

1. Non-baked color pencil leads comprising a pigment, a filler and a binder, at least one of said pigment and said filler being all or partially covered with a fluorinated aromatic compound, said pencil leads having open pores impregnated with an oil, a fat and/or a wax.

2. The non-baked color pencil leads according to claim 1 wherein the amount of said pigment and/or said filler covered with said fluorinated aromatic compound is in the range of 15 to 70% by weight based on the amount of the total blend composition.

3. The non-baked color pencil leads according to claim 1 wherein said fluorinated aromatic compound comprises at least one of fluorinated aromatic compounds comprising pitch fluoride and fluorinated compounds constituted with 7 or less rings.

4. The non-baked color pencil leads according to claim 1 wherein said fluorinated aromatic compound is a pitch fluoride.

5. A method for preparing non-baked color pencil leads which comprises the steps of kneading a solvent and/or a plasticizer with a blend composition comprising a pigment, a filler and a binder, at least one of the pigment and the filler being all or partially covered with a fluorinated aromatic compound; extruding the kneaded material; drying the extruded articles to remove said solvent and/or said plasticizer and to thereby form open pores therein owing to the less wettability of said fluorinated aromatic compound-covered pigment and/or said fluorinated aromatic compound-covered filler; and then impregnating the open pores of the resultant porous articles with an oil, a fat and/or a wax.

6. The method for preparing non-baked color pencil leads according to claim 5 wherein the amount of said fluorinated aromatic compound-covered pigment and/or said fluorinated aromatic compound-covered filler is in the range of 15 to 70% by weight based on the amount of said total blend composition.

7. The method for preparing non-baked color pencil leads according to claim 5 wherein said fluorinated aromatic compound comprises at least one of fluorinated aromatic compounds comprising a pitch fluoride and a fluoritated compound constituted with 7 or less rings.

8. The method for preparing non-baked color pencil leads according to claim 5 wherein said fluorinated aromatic compound is a pitch fluoride.

* * * * *